No. 635,111. Patented Oct. 17, 1899.
J. C. TUNNICLIFF.
HARROW TOOTH FASTENING.
(Application filed June 27, 1899.)
(No Model.)
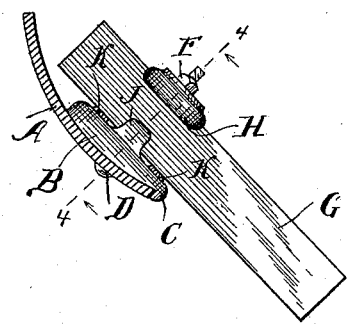
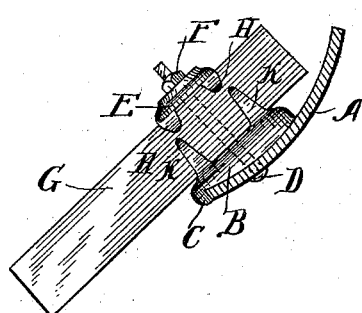
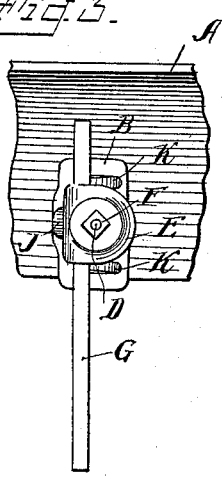
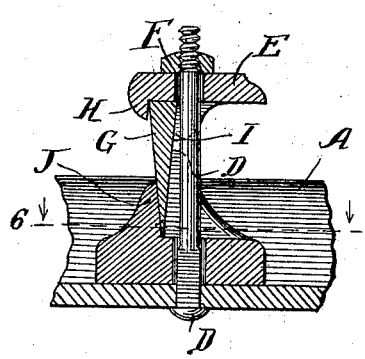
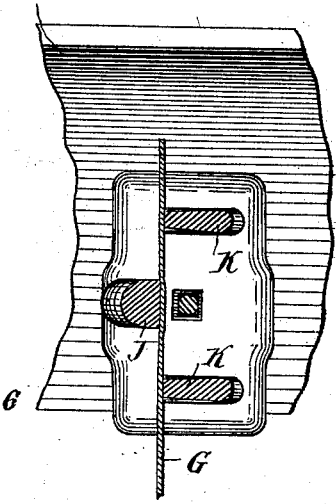
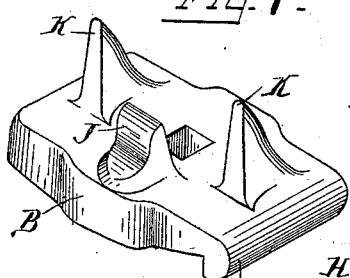
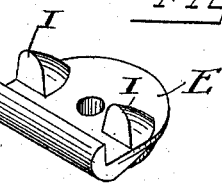
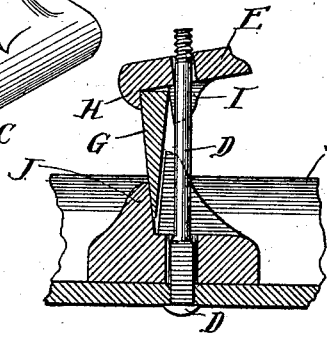
Witnesses
G. R. Richards.
J. B. Weir.
Inventor
John C. Tunnicliff
By Raymond & Omohundro and
H. M. Richards, Attys.

UNITED STATES PATENT OFFICE.

JOHN C. TUNNICLIFF, OF MOLINE, ILLINOIS, ASSIGNOR TO THE D. M. SECHLER CARRIAGE COMPANY, OF SAME PLACE.

HARROW-TOOTH FASTENING.

SPECIFICATION forming part of Letters Patent No. 635,111, dated October 17, 1899.

Application filed June 27, 1899. Serial No. 722,026. (No model.)

*To all whom it may concern:*

Be it known that I, JOHN C. TUNNICLIFF, a citizen of the United States, residing at Moline, in the county of Rock Island and State of Illinois, have invented certain new and useful Improvements in Harrow-Tooth Fastenings, of which the following is a specification.

This invention relates to improvements in harrow-tooth fastenings, and has for its primary object to provide for securing the harrow-teeth to the bottom of a harrow-section by clamping alone without necessity for perforating the teeth or having any adjustability between the clamping device and the harrow-beam.

Another object is to have the harrow-tooth readily adjustable with relation to its fastening device, so that it may be adjusted to varying lengths with relation to the harrow-beam or turned end for end with relation thereto and yet be firmly and rigidly secured in any adjusted position without injury thereto.

A further object is to simplify the construction and cheapen the cost of manufacture of harrow-sections, and particularly of the devices for attaching the teeth to the sections.

These and such other objects as may hereinafter appear are attained by the devices illustrated in the accompanying drawings, in which—

Figure 1 represents a section through a harrow-beam, showing the teeth and fastening devices in side elevation. Fig. 2 is a view similar to Fig. 1, but taken from the opposite side of the teeth and fastening devices. Fig. 3 is rear elevation of Fig. 1 as viewed from a position at right angles to the rear face of the teeth. Fig. 4 is a transverse section on the line 4 4 of Fig. 1 looking in the direction indicated by the arrows, showing the parts in position before being tightened. Fig. 5 is a view similar to Fig. 4, but showing the parts tightened. Fig. 6 is a section on the line 6 6 of Fig. 5 looking in the direction indicated by the arrows. Fig. 7 is a perspective view of the larger clamp-plate, and Fig. 8 is a perspective view of the small clamp-plate shown upside down.

Similar letters of reference indicate the same parts in the several figures of the drawings.

I have shown my fastening device as applied to a steel harrow-beam A, which is curved or concave in cross-section in the direction in which the harrow is to be drawn, this style of harrow-beam being economical and furnishing an especially advantageous construction for the attachment of my fastening device; but I may here state that my device by proper change in the face of the larger clamping-plate B opposing the beam may be adapted for use in connection with any style of harrow-beam, either wood or metal, and of any size or contour. When constructed for use in connection with a curved beam such as is shown in the drawings, I prefer to provide a seat for the larger clamp B by curving the back face thereof to correspond with the inner face of the beam and providing a shoulder C at the lower edge thereof, against which the lower edge of the beam abuts. This clamping-plate and the beam are perforated at a point preferably corresponding to the center of the plate, as illustrated more clearly in Fig. 6, to receive a bolt D of suitable length and preferably squared along the part thereof extending through the beam and larger clamping-plate to prevent rotation of the bolt D. The opposite end of this bolt passes centrally through a small clamp-plate E and is provided with a nut F, screwed thereto upon the end of the bolt, by means of which the small clamp-plate may be forced down toward the larger clamp-plate.

Between the clamp-plates B and E and at one side of the bolt D is inserted the harrow-tooth G, which I prefer should be a short section of a steel bar wedge-shaped or triangular in cross-section, as more clearly illustrated in Fig. 5, the apex or sharp edge of said bar opposing the larger clamp-plate, while the broad edge of said bar opposes the small clamp-plate.

Along one edge of the small clamp-plate is formed a shoulder H, or it may be two or more depending lugs lying upon one side of the tooth, while upon the opposite side of the tooth said plate is provided at its opposite edges with depending lugs I. The distance between the bases of the shoulder H and the lugs I is intended to correspond substantially with the width of the side edge of the harrow-tooth, while the opposing inner faces of said shoulder and lugs are arranged at such an angle that before the tightening-nut F is screwed up the clamp-plate assumes a slightly-angular position with relation to the tooth; but when the nut is tightened up the clamp-plate is brought down to a position at right angles to the tooth, at which time the lugs I, which are about twice the length of the shoulder H, bear against the side of the tooth, while said shoulder is clear of the tooth, as illustrated in Fig. 5.

The larger clamp-plate is provided with three lugs J and K K along its length in staggered relation, the lug J being substantially at the center of length of the clamp-plate at one side of the line of the tooth, while the other lugs K K are near the ends of the plate on the opposite side of said line. The opposing inner faces of these lugs—that is, the face of the lug J with relation to the faces of the lugs K K—converge toward the body of the plate on lines substantially corresponding with the tapering sides of the harrow-tooth, crossing each other slightly above the body of the plate, but are intended to be so disposed that when the clamp is tightened the edge of the tooth does not extend quite down to the body of the plate, and hence the tooth will be caused to wedge in between the lugs J and K K when the fastening device is tightened up.

By reason of the staggered relation between the lugs J and K K when the edge of the harrow-tooth is forced down so that it is clamped between said lugs with a proper degree of force to hold the tooth immovable in position the lower edge or that part of the tooth between the lugs K K is sprung laterally slightly out of line by contact with the lug J, which serves to fix the tooth firmly against endwise movement. The laterally-disposed lugs I upon the small clamp plate or cap being out of contact with the side of the tooth causes the lugs I to exert a slight lateral force on the tooth when the fastening device is tightened, thus serving as a means auxiliary to the staggered lugs J and K K to hold the tooth against endwise movement.

As the tooth is formed of steel, the effect of the clamp-plates thereon is to simply spring the tooth laterally and not bend and set the same, so that the tooth may be readily adjusted lengthwise in the clamp, so as to cause it to extend a greater or less distance from the harrow-beam.

A harrow-tooth fastening embodying my invention is simple in construction, is easy to apply and adjust, and is comparatively inexpensive, as all parts thereof, except the bolt, are simply castings. Obviously various modifications and changes in the construction and arrangement of the parts may be made, such as the means for attaching the larger clamp-plate to the harrow-beam or providing against movement thereof upon the beam, as well as in the shape of the clamp-plates and the lugs thereon, without departing from the spirit of my invention so long as such changes attain the objects thereof, and hence all such changes are within the purview of my invention.

Having thus fully described my invention, what I claim, and desire to secure by Letters Patent, is—

1. The combination with a harrow-tooth beam, of a tooth-fastener comprising a pair of clamping-plates, a harrow-tooth, wedge-shaped in cross-section, interposed between said plates and a tightening-bolt passing through said plates at one side of said tooth, substantially as described.

2. The combination with a harrow-tooth beam and a harrow-tooth, wedge-shaped in cross-section, of a pair of clamping-plates each provided with opposing lugs, between which said tooth is held, and a tightening-bolt passing through said plates at one side of said tooth, substantially as described.

3. The combination with a harrow-tooth beam and a harrow-tooth, wedge-shaped in cross-section, of a pair of clamping-plates each provided with opposing lugs between which said tooth is held, and a tightening-bolt passing through said plates at one side of said tooth, the lugs of one of said plates being arranged in staggered relation, substantially as and for the purpose described.

4. The combination with a harrow-tooth beam and a harrow-tooth, wedge-shaped in cross-section, of a pair of clamping-plates each provided with opposing lugs, between which said tooth is held, and a tightening-bolt passing through said plates at one side of said tooth, the opposing faces of the lugs on one of said plates being so disposed that both of said faces cannot simultaneously come in contact with the tooth, substantially as and for the purpose described.

5. The combination with a harrow-tooth beam and a harrow-tooth, wedge-shaped in cross-section, of a pair of clamping-plates each provided with opposing lugs, between which said tooth is held, and a tightening-bolt passing through said plates at one side of said tooth, the opposing faces of the lugs on one of said plates being so disposed that both of said faces cannot simultaneously come in contact with the tooth, and the lugs of the other plate being arranged in staggered relation, substantially as and for the purpose set forth.

6. The combination with a harrow-tooth beam and a harrow-tooth, wedge-shaped in cross-section, of a pair of clamping-plates each provided with opposing lugs, between which said tooth is held, and a tightening-bolt passing through said plates at one side of said tooth, one set of lugs on each of said plates extending a greater distance from the plates on one side of the tooth than those on the other side of the tooth, substantially as described.

JOHN C. TUNNICLIFF.

Witnesses:
H. M. ROSSITER,
W. J. DAVIS.